July 25, 1950  G. F. E. GALEY ET AL  2,516,561
ELECTRIC SWITCH
Filed Oct. 7, 1948  3 Sheets-Sheet 1
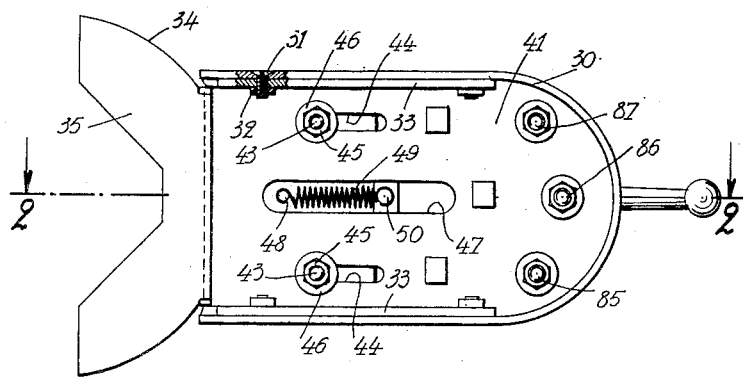
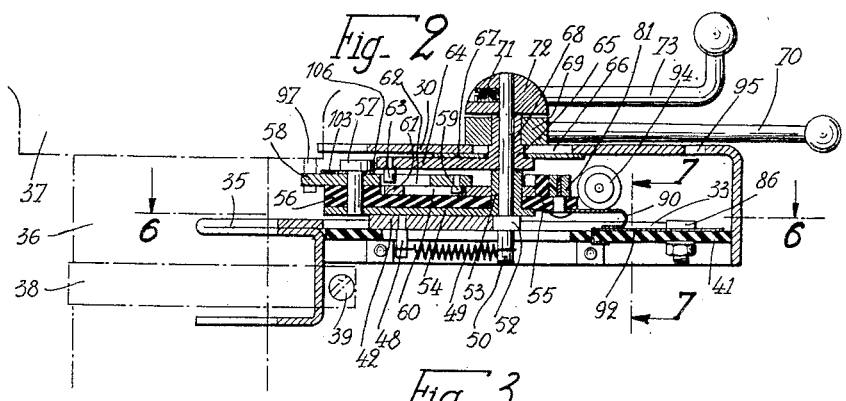
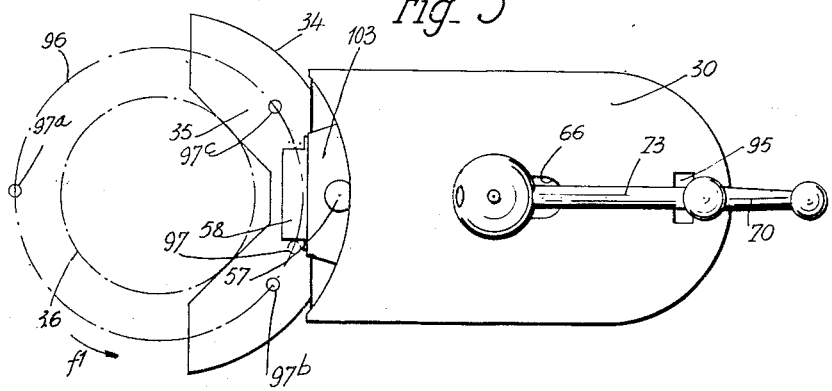
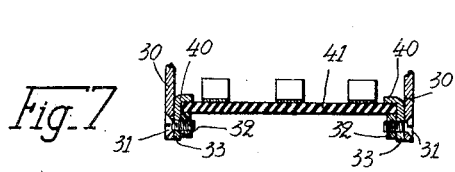
INVENTORS:
GEORGES FERNAND EMILE GALEY
PAUL MARCEL LUCIEN GALEY
by Richardson, David and Nordon
ATTY'S

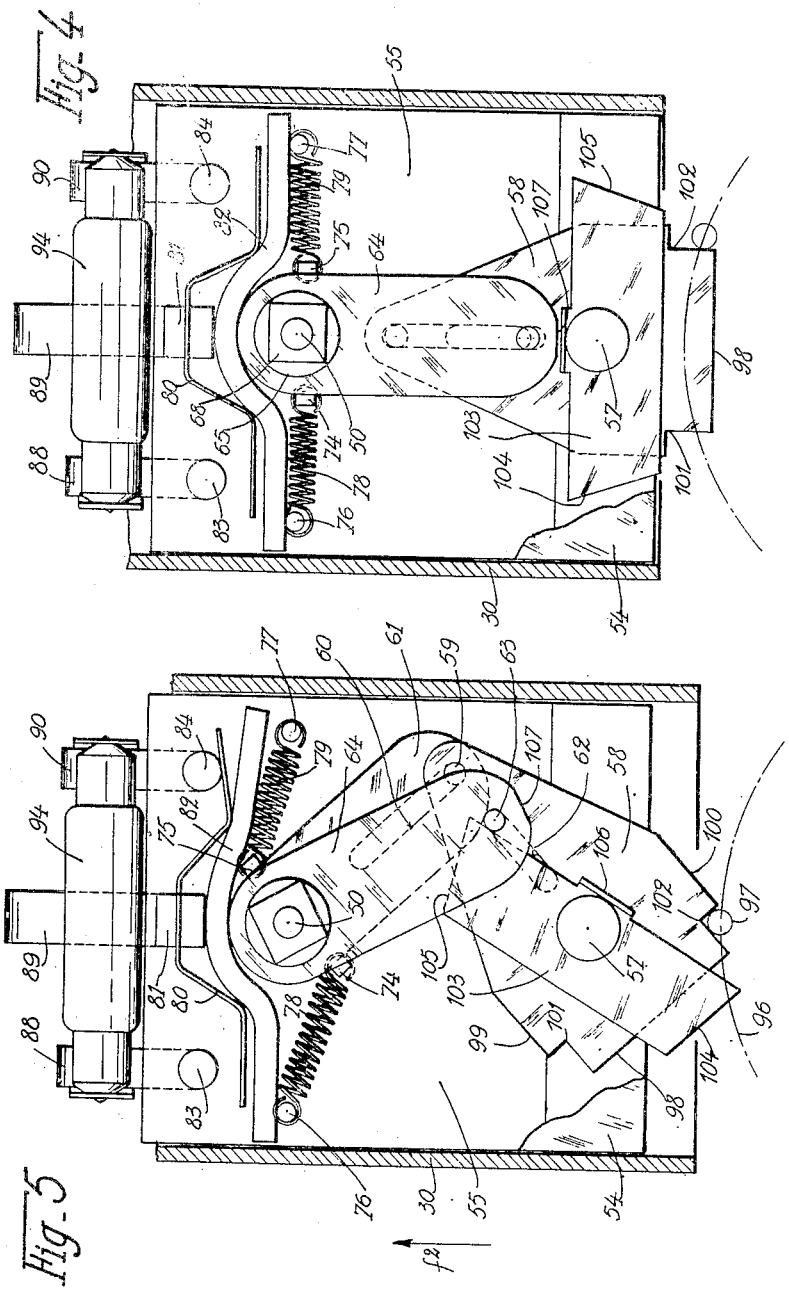

July 25, 1950
G. F. E. GALEY ET AL
2,516,561
ELECTRIC SWITCH
Filed Oct. 7, 1948
3 Sheets-Sheet 3
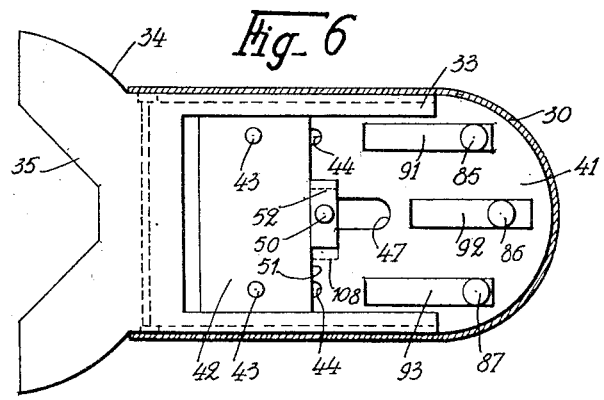
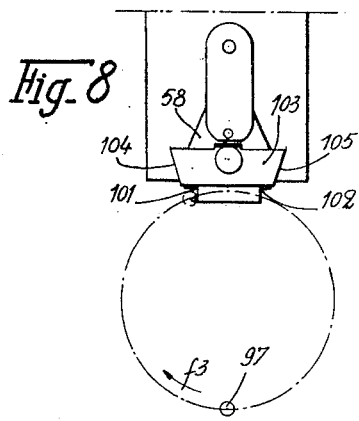
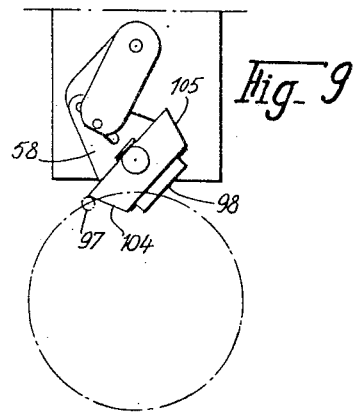
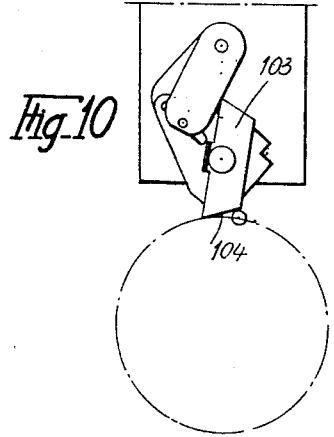
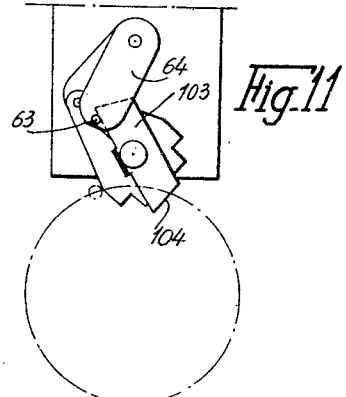
INVENTORS:
GEORGES FERNAND EMILE GALEY
PAUL MARCEL LUCIEN GALEY
By Richardson, David and Nordon
ATTYS Patented July 25, 1950

2,516,561

UNITED STATES PATENT OFFICE 2,516,561

ELECTRIC SWITCH

Georges Fernand Emile Galey and Paul Marcel Lucien Galey, Paris, France

Application October 7, 1948, Serial No. 53,216
In France October 7, 1947

12 Claims. (Cl. 200—59)

The present invention relates to improvements in electric switches in general and more particularly to devices of this character for use on motor vehicles for controlling the direction signals, auxiliary headlamps or like indicators.

One object of the invention is to provide a switch of this character which may be selectively operated either by hand or by the steering wheel of the vehicle to energize the indicators while the steering wheel is rotated in either direction, and will be returned to neutral or inoperative position by said steering wheel after a turn has been completed, the operating way of the switch thus being at will semi-automatic or automatic.

Another object of the invention is to provide a switch of the aforesaid character which embodies a novel construction of parts through the medium of which the switch may be readily and quickly installed on any type of vehicles even of different gear reducing ratio for the steering control.

Other objects and advantages of the invention will become apparent from the following specification, with reference to the accompanying drawing given by way of example and wherein:

Fig. 1 is a bottom plan view of an embodiment of the switch according to the invention;

Fig. 2 is a section along the longitudinal axis of symmetry 2—2 of the switch shown in Fig. 1, showing the latter mounted on the steering column of a vehicle;

Fig. 3 is a top plan view of the switch shown in Fig. 1;

Fig. 4 is a double-scale view, corresponding to Fig. 3, the upper wall of the case being cut away in order to show the mechanism of the switch in the inoperative position;

Fig. 5 is a view corresponding to Fig. 4, of the switch in the operative position;

Fig. 6 is a section along the line 6—6 of Fig. 2;

Fig. 7 is a section along the line 7—7 of Fig. 2;

Figs. 8, 9, 10 and 11 show diagrammatically various intermediate positions of the mechanism of the switch.

As shown in the drawing, the mechanism of the switch is enclosed in a housing 30 secured by means of screws 31 and nuts 32 (Figs. 1, 2 and 7) to the arms 33 (Figs. 1, 2, 6, 7) of a U-shaped supporting bracket 34, the base 35 of which is of suitable shape for enabling said bracket to be arranged on the steering column 36 of the vehicle adjacent the hub 37 of the steering wheel, and secured to said column by suitable fixing means such as a collar 38 adapted to be tightened by a nut equipped bolt 39.

The arms 33 of the bracket 34 have a marginal bent portion 40 forming an abutment edge (Fig. 7) against which is held by means of nuts 32 an insulating base plate 41, the contour of which is of substantially complemental shape to that of the housing 30 (Fig. 6). On the upper face of the base plate 41 and between the arms 33 is arranged an abutment plate 42 (Figs. 2 and 6) provided on its lower face with downwardly projecting pins 43 adapted to engage and pass through longitudinal elongated openings 44 of the plate 41, whereby it is possible to move the abutment plate 42 longitudinally with respect to the base plate 41 and to retain it in a predetermined position by means of nuts 45 which are screwed on the free end of the pins 43 and tightened against the plate 41 with the interposition of washers 46. The base plate 41 is provided at its middle with a third longitudinal opening 47, through which passes a downwardly projecting pin 48 secured to the abutment plate 42. A helical spring 49 is tensioned between said pin 48 and the lower end of a vertical shaft 50 which is adapted to bear against the edge 51 of the abutment plate 42 (Figs. 2, 6) by one of the faces of a rectangular cam member 52 which is secured to said shaft and the thickness of which is substantially equal to that of the abutment plate 42. The portion of the shaft 50 located above the cam 52 is mounted for rotation in a sleeve 53 secured by its lower end to a plate 54 (Figs. 2, 4, 5) supporting the mechanism proper of the switch. The plate 54 rests against the abutment plate 42 and can slide between the side walls of the housing 30. On the plate 54 is fixed an insulating plate 55 provided with an opening for the sleeve 53 to pass through and, on the opposite side to said opening, a raised portion 56 on which is adapted to pivot by means of a headed pin 57, a first lever 58 or automatic control lever (Figs. 2, 4, 5), one end or outer end of which projects beyond the raised portion 56 of the insulating plate 55 toward the steering column. The lever 58 is provided at its other end with a projection 59 that projects downwards in a longitudinal slot 60 provided in a second lever 61 which is mounted for rotation about the sleeve 53 and rests on the insulating plate 55.

The lever 58 is also provided with a longitudinal slot 62 in which engages a projection 63 carried by one end of a third lever 64 or manual control lever having its other end secured to a bushing 65. The bushing 65 is mounted for rotation about the shaft 50 and projects upwards through an elongated opening 66 (Figs. 2, 3) provided in the upper wall of the housing 30. Preferably a resilient washer 67 is interposed between the lever 64 and the wall of the housing 30. The bushing 65 includes an extension 68 projecting beyond the wall of the housing and having for example a square cross-section for the reception of a hub 69 of corresponding square inner cross-section. A radial finger lever 70 secured to the hub 69 enables the third lever 64 to be rotated.

At the upper end of the shaft 50, which projects beyond the extension 68 of the bushing 65, is fixed by means of a clamping screw 71 a terminal hub 72 provided with a radial lever 73 which enables the cam member 52 to be rotated and brought into two positions of stable equilibrium corresponding to the small or to the large edges of the cam member, whereby a translatory movement equal to half the difference between the lengths of said edges may be imparted to the plate 54 supporting the mechanism of the switch.

The second lever 61 is provided with two lateral upwardly bent lugs 74 and 75 (Figs. 4 and 5); between said lugs on the one hand, and two studs 76 and 77 secured in and projecting from the upper face of the insulating plate 55 on the other hand, are stretched two helical tension springs 78 and 79 which tend to keep the lever 61 in an intermediate or inoperative position as shown in Fig. 4.

The length of the slot 60 of the second lever 61 is such that lever 58 may be moved away from its neutral position (Fig. 4) between two deflected positions (Fig. 5), in which the levers 58 and 61 form an angle which is at most equal to 90°.

In this case, the force acting on the projection 59 of the lever 58 due to the retracting torque of the springs 78 and 79, encounters the axis of the pin 57, so that the system of levers 58 and 61 is in equilibrium. If the aforesaid angle is equal to or very slightly smaller than 90°, a slight torque exerted on the lever 58 in a direction that tends to return it to the neutral position is sufficient to upset the equilibrium and return the system to the neutral or inoperative position (Fig. 4).

The length of the slot 62 of the lever 58 should be sufficient to enable the projection 63 to move the lever 58 into either of its deflected positions.

The electric portion of the switch comprises a resilient conducting blade 80 arranged in such a manner as to close either circuit of the indicators when the lever system is in either of the aforesaid deflected positions; the blade 80 is secured at its middle portion in a post 81 set in the insulating plate 55 in the longitudinal axis of the switch. The ends of the blade 80 are bent over towards the lever 64 (Fig. 4) and symmetrically bent back parallel to the springs 78 and 79. Between the blade 80 on the one hand and said springs and lever on the other hand is wedged a strip of resilient insulating material 82.

Adjacent the ends of the blade and the other side of the springs 78 and 79 are located two contact posts 83 and 84 which are also fixed in the insulating plate 55; the shape of the blade 80 is such that in the deflected positions of the switch, one of the springs 78 or 79 urges one of the ends of the blade 80 against one of the posts 83 or 84 and closes one or the other of the circuits (not shown) of the indicators of the vehicle.

The posts 81, 83 and 84 are permanently connected to three corresponding terminals 85, 86, 87 on the base plate 41 (Figs. 1, 2, 6), by means of three sliding contacts 88, 89 and 90 adapted respectively to bear against three conducting blades 91, 92 and 93 (Fig. 6) of sufficient length to ensure the electric connection between the terminals irrespective of the position of the sliding plate 54. A pilot bulb 94 is preferably connected across the terminals 83 and 84 so as to light when a direction indicator is actuated. Said bulb illuminates a window 95 (Figs. 2 and 3) provided in the wall of the casing.

The switch is mounted below the hub 37 of the steering wheel in such a manner that the outer end of the first lever 58 is located on the path 96 of at least one finger such as 97 projecting from under the hub of the steering wheel (Figs. 2, 3, 4, 5). As shown in the drawing, the outer end of the lever 58 has for example a front edge 98 which is at right angle to the longitudinal axis of the switch when the lever 58 is in the position of stable equilibrium or inoperative position, and two symmetrical side edges 99 and 100.

On each side of the outer end of the lever 58 are provided two angular notches 101 and 102 respectively having a longitudinal side and a transverse side. Finally, between the head of the pin 57 and the upper face of the first lever 58 is arranged a rocking abutment member 103 which is mounted for rotation about said pin, preferably with the interposition between the head of the pin and said member of a resilient means such as a resilient washer or a small spring (not shown) whereby said member is adapted to frictionally engage the upper face of said lever 58. The member 103 is for example formed by a flat member having two symmetrical side edges 104 and 105 such that the radial distance between said edges and the axis of the pin 57 is slightly greater than the distance between any point of the outer end of the lever 58 and the axis of said pin. The edges 104 and 105, which are to be engaged by the finger 97, as will be seen hereinafter, preferably have a rough or toothed surface whereby an efficient frictional or abutting engagement of the finger with the member 103 is obtained.

The member 103 is preferably of sufficiently small thickness to enable it readily to penetrate between the first lever 58 and the third lever 64 (Fig. 5) which may for example be slightly spaced apart from one another (Fig. 2). The width of the member 103 should furthermore be sufficient to enable said member to abut against the projection 63 of the third lever 64 in such a manner that said member can rock between two limiting positions, one of which is shown in Fig. 5.

The member 103 is preferably provided with a stop 106 adapted to co-operate with a terminal flat portion 107 provided at the end of the lever 64 adjacent the pin 57 (Fig. 4), the distance between the stop 106 and the flat portion 107 being sufficiently small so that, the lever system being in its neutral position, the member 103 cannot rock freely on either side of its normal position (Fig. 4) and place itself on the path of the finger 97, which would be liable to prevent the switch from operating at the opportune moment.

The apparatus operates as follows:

The case will first be considered in which the switch is mounted on a vehicle provided with only a slightly geared down steering control, i. e. the total rotation of the steering wheel in either direction is less than one revolution and a half. In this case, the rocking abutment member 103 is eliminated and it is only necessary to eliminate from the ensuing description. The cam member 52 is positioned so as to bear against the edge 51 of the plate 42 along a large side, this position corresponding to the so-called automatic operation of the switch. The plate 42 is adjusted relatively to the steering column by means of the nuts 46, in such a manner that, if the lever 58 is in its neutral position the finger 97 abuts against the longitudinal side of one or other of the notches 101 and 102 preferably as close as possible to the edge 98 (Fig. 4).

The neutral position of the finger corresponding to a straight travel of the vehicle being for example that shown at 97a (Fig. 3), if the driver turns the steering wheel in the direction of the arrow $f_1$, the finger 97 encounters the longitudinal side of the notch 102, causes the lever 58 to rock (Fig. 5) and at the same time urges the plate 54 and moves it in the direction of the arrow $f_2$ against the action of the spring 49, the finger 97 being thus engaged in the notch 102. The blade 80 comes into contact with the post 84 thus causing the corresponding indicator to be operated.

If at this instant the driver turns the steering wheel in the opposite direction, the finger 97 abuts against the transverse side of the notch 102 and returns the lever 58 to its original position while the circuit of the indicator is opened. If, on the other hand, the driver keeps on turning the steering wheel in the direction of the arrow $f_1$, the finger 97 passes over the position which it occupies in Fig. 5 and again urges the lever 58 together with the plate 54 in the direction of the arrow $f_2$; after it has passed over this position, the plate 54 is retracted by the spring 49, while the lever 58 remains in one of the aforesaid deflected positions. The driver can thus keep on turning the steering wheel until the finger 97 again assumes a position adjacent the lever 58, the finger having thus effected a rotation at the most equal to a revolution and a half. At this instant, the limiting angle of rotation of the steering wheel is reached as assumed and there is no danger of the finger again abutting against the lever. During the return travel of the steering wheel the finger 97 abuts against the front edge 98 of the lever 58 and returns the latter to its neutral or inoperative position shown in Fig. 4.

In the case in which the total rotation of the steering wheel is less than one revolution, use may advantageously be made of two symmetrical fingers such as those shown, in the neutral position of the steering wheel, at 97b and 97c in such a manner as to cover a suitable arc of a circle which may for example be slightly larger than that occupied by the outer end of the lever 58 so that the inoperative period between the beginning of the rotation of the steering wheel and the instant when one of the fingers actuates the lever 58 is reduced to a desired minimum extent. If it is desired to obtain the same result with a steering wheel whose total rotation is greater than one revolution but less than one revolution and a half, it is only necessary to use two fingers 97b and 97c located in different planes and respectively adapted to actuate two separate switches.

When it is desired to use the switch in the semi-automatic manner, the shaft 50 is rotated by means of the lever 73 in such a manner as to cause the cam member 52 to bear with its small side against the edge 51 of the plate 42. The cam member 52 is so calculated that the translation in the direction of the arrow $f_2$ effected by the mechanism is such that when the lever 58 is in the neutral position (Fig. 4), the distance between the front edge 98 of said lever and the axis of rotation of the steering wheel is slightly greater than the radius of the path of the finger 97, suchwise the finger 97 can only encounter the lever 58 when said lever is in one of its deflected or operative positions.

In this case, before turning the steering wheel, the driver actuates the switch in the suitable direction by means of the lever 70 to bring the lever 58 into a deflected position of unstable equilibrium. While the steering wheel is being rotated, the finger 97 encounters one or other of the side edges 99, 100 and pushes back the mechanism as hereinbefore described; during the return travel of the steering wheel, the projection abuts against the edge 98 of the lever 58 and returns the same to the neutral position. The operation is the same in the case in which two juxtaposed or superposed fingers are used.

In the case of an only slightly geared down steering control which has just been described, only one contact therefore occurs between a finger and the lever 58 during one complete rotation of the steering wheel, the number of projections being equal to 1 or to 2.

In the case in which the switch is mounted on a vehicle having a highly geared down steering control, i. e. the complete rotation of the steering wheel is greater than one revolution and a half but less than two revolutions and a half, said switch should be provided with the rocking abutment member 103, since it will be understood that in this case two successive contacts occur between a finger and the lever during one total rotation of the steering wheel, so that during the return travel of the steering wheel, the first of said contacts returns the lever to the neutral position and the second contact actuates the lever in the opposite direction and causes an untimely operation of the other indicator whereas the return travel of the steering wheel is not yet completed.

The rocking abutment member 103 is precisely intended to prevent the first contact between a finger and the first lever from occurring during the return travel of the steering wheel. The operation of this member will be understood by referring to Figs. 8, 9, 10 and 11. If the switch is in the automatic position (Figs. 2, 3), the driver turns for example the steering wheel in the direction of the arrow $f_3$ (Fig. 8). The finger 97 abuts against the longitudinal edge of the notch 101 and resiliently urges back the mechanism supporting plate 54 as hereinbefore described and places the lever 58 in a deflected position (Fig. 9).

As the driver keeps on turning the steering wheel in the direction of the arrow $f_3$, the finger 97 comes in front of the side edge 104 of the member 103 (Fig. 9) and resiliently urges back the plate 54 by means of said member without engaging the lever 58 (Fig. 10) which is kept in its deflected position.

The rotation of the member 103 is limited by the projection 63 of the lever 64 as hereinbefore described so that the edge 104 of said member remains in the path of the finger 97 (Fig. 11). After it has passed the lever 58, the finger 97 can still describe slightly less than one revolution, so that the total rotation of the steering wheel may reach two revolutions and a half. During the return travel of the steering wheel, in the opposite direction to the arrow $f_3$, the finger 97 abuts against the face 104 of the member 103 (Fig. 11), rocks same and urges back the plate 54 without upsetting the equilibrium of the lever 58 (Figs. 10 and 9) and, after having described one revolution, abuts against the front edge 98 of the lever 58 and returns same to the neutral position (Fig. 8).

It is possible, as hereinbefore described, to reduce the inoperative period between the beginning of the rotation of the steering wheel and the operation of the switch, by using two symmetrical fingers cooperating with one or two switches. The choice of the number of fingers and their angular setting in the case in which there are two, obviously depends on the gear-down ratio of the steering control of the vehicle used.

The semi-automatic operation of the switch is the same as in the case in which there is no rocking abutment member.

By way of a modification, it is possible to provide a cam member 52 which enables a third stable position of the mechanism to be obtained, in which the lever 58 is completely outside the path of the projection 97, even when said lever is in an inclined position, the operation of the switch in this case being completely manual. For this purpose, it is only necessary for example to make the rectangular cam member 52 slightly eccentric in its lengthwise direction, as shown at 108 (Fig. 6) in broken lines.

Naturally, the invention is not limited to the embodiments described and illustrated, which have only been given by way of illustrative and non-limitative examples.

Thus, it would be possible without exceeding the scope of the invention, to vary the inclination and the shape of the levers, cam and rocking abutment member, the number and the relative arrangement of the projections and to combine a plurality of switches, according to requirements.

It would also be possible to eliminate the manual levers 64 and 70, the manual control of the switch being effected through the medium of two symmetrical fingers such as 97b and 97c which therefor are integral with a hand operable rotary portion of the steering wheel.

The various parts of the switch, other than the electric contacts, may be made of metal or of plastic material.

The use of the switch is naturally not limited to the control of road signals for vehicles such as light signals, auxiliary headlamps, and the like, but also extends to the control of any devices whose operation is dependent on the movement of a member adapted to effect a rotary or a translatory reciprocating movement.

Having now described our invention what we claim as new and desire to secure by Letters Patent is:

1. A switch comprising a housing, means for mounting the housing on a vehicle, contacts mounted in the housing, a first lever pivoted in the housing and provided with a projecting portion in operative relation with a rotatable element of the vehicle, a second lever pivoted in the housing and slidably connected with said first lever such wise that said levers are adapted to tilt between two deflected positions in which said levers are at an angle with one another which at most equals 90°, a contact member selectively engageable with said contacts and operable by said second lever when the latter is in a deflected position, resilient means for biasing the second lever toward an intermediate position whereby said first lever is in equilibrium in each of said deflected positions and means for slidably mounting said first lever in the housing whereby said first lever is resiliently brought to one of said deflected positions upon movement of said element in one direction and to said intermediate position upon movement of said element in the opposite direction.

2. A switch as claimed in claim 1, further comprising a manually operable lever operatively connected with said first lever actuating the same to either of said deflected positions.

3. A switch comprising a housing, means for mounting the housing on a vehicle, contacts mounted in the housing, a first lever pivoted in the housing and provided with a projecting portion in operative relation with a rotatable element of the vehicle, a second lever pivoted in the housing and slidably connected with said first lever suchwise that said levers are adapted to tilt between two deflected positions in which said levers are at an angle with one another which at most equal 90°, a contact member selectively engageable with said contacts and operable by said second lever when the latter is in a deflected position, resilient means for biasing the second lever toward an intermediate position whereby said first lever is in equilibrium in each of said deflected positions, means for slidably mounting said first lever in the housing whereby said first lever is resiliently brought to one of said deflected positions upon movement of said element in one direction and to said intermediate position upon movement of said element in the opposite direction, and a manually operable third lever pivoted in said housing and slidably connected with said first lever for actuating the same to either of said 4. A switch comprising a housing adapted to be attached to the steering column of a vehicle and having an aperture through which a projecting element rotatable with the steering wheel is adapted to move, a base portion slidable in said housing to and from said steering column, a first lever pivoted in said base portion and provided with a projecting portion projecting in the path of said element, a second lever pivoted on said slidable base portion, a projection carried by said first lever and movable within a slot of the second lever, said slot being of such a length that said levers are adapted to tilt between two symmetrical deflected positions in which they are at an angle with one another which at most equals 90°, switching means including fixed contacts mounted in said base portion and a movable contact member operable by said second lever to selectively engage said contacts, resilient means for biasing said second lever toward an intermediate position, whereby each of deflected and intermediate positions of the first levers is stable, a manually operable third lever pivoted on said slidable base portion and provided with a projection slidable in a slot of the first lever for operatively actuating the same to either of said deflected positions, and resilient means for biasing said slidable base portion toward the path of said projecting element.

5. In a switch as claimed in claim 4, a manually operable cam member pivoted within said housing and adapted to set the slidable base portion in either of two stable positions, viz. a projected position such that said projecting portion of the first lever is in the path of said projecting element in each of its deflected and intermediate positions and a partly retracted position such that said projecting portion is on the path of said projecting element only in either of the deflected positions of said first lever.

6. A switch comprising a housing adapted to be attached to the steering column of a vehicle and having an aperture through which a projecting element rotatable with the steering wheel is adapted to move, a base portion slidable in said housing to and from said steering column, a first lever pivoted in said base portion and provided with a projecting portion projecting in the path of said element, a second lever pivoted on said slidable base portion and spring biased to a stable middle position, a projection carried by said first lever and movable within a slot of the second lever, said slot being of such a length that said levers are adapted to tilt between two stable deflected positions on either side of said middle position, switching means operable by said second lever, a manually operable third lever pivoted on said base portion about the same pivot as the second lever and adapted to tilt the first lever in either of its deflected positions, and a manually operable cam member pivoted about the aforesaid pivot on said base portion and adapted to cooperate with an abutting portion of said housing for setting the slidable base portion in two stable positions, viz. a projected position and a partly retracted position.

7. A switch as claimed in claim 6 wherein said abutting portion is slidably adjustable relatively to said housing.

8. A switch as claimed in claim 6 wherein said manually operable cam member is arranged and constructed so as to provide for said slidable base portion a third stable position such that said projecting portion of the first lever is constantly kept out of reach of said rotatable projecting element.

9. In a structure as claimed in claim 6, in addition to said projecting element, a second projecting element angularly spaced from the first one, both elements being normally arranged on opposite sides of said first lever for actuation of the same upon rotation of the steering wheel in opposite directions.

10. In a switch as claimed in claim 6, a rocking member pivoted on the same pivot as said first lever and adapted to rotate therewith when said lever is actuated, said rocking member having two symmetrical edges adapted to be engaged by a projecting element when the first lever is in a deflected position, and the radial distance between either edge and said pivot being slightly greater than the distance between any point of the projecting portion of said first lever and the pivot, suchwise that upon engagement with one of said edges of a projecting element, the latter urges away said rocking member and said first lever, without modifying the deflected position of said first lever.

11. A switch as claimed in claim 6, wherein said projecting portion of the first lever comprises two side edges respectively engageable by said projecting element when said first lever is in a middle position and a front edge engageable by said projecting element when said first lever is in a deflected position.

12. A switch as claimed in claim 11 wherein said projecting portion of the first lever comprises at its end adjacent the steering column two symmetrical notches having respectively a longitudinal side firstly engageable by said projecting element and a transverse side engageable by said element after said longitudinal side suchwise that said element is fitted over by a notch when passing said projecting portion.

GEORGES FERNAND EMILE GALEY.
PAUL MARCEL LUCIEN GALEY.

REFERENCES CITED

The following references are of record in the file of this patent:

UNITED STATES PATENTS

| Number | Name | Date |
| --- | --- | --- |
| 2,276,411 | Moore | Mar. 17, 1942 |
| 2,276,413 | Moore | Mar. 17, 1942 |
| 2,280,110 | Weinen | Apr. 21, 1942 |
| 2,282,709 | Day | May 12, 1942 |
| 2,284,936 | Wilshusen | June 2, 1942 |
| 2,299,876 | Breeze | Oct. 27, 1942 |
| 2,427,595 | Fuller | Sept. 16, 1947 |